(No Model.)
W. MacN. FAIRFAX.
SYSTEM OF ELECTRICAL DISTRIBUTION.
No. 549,189. Patented Nov. 5, 1895.
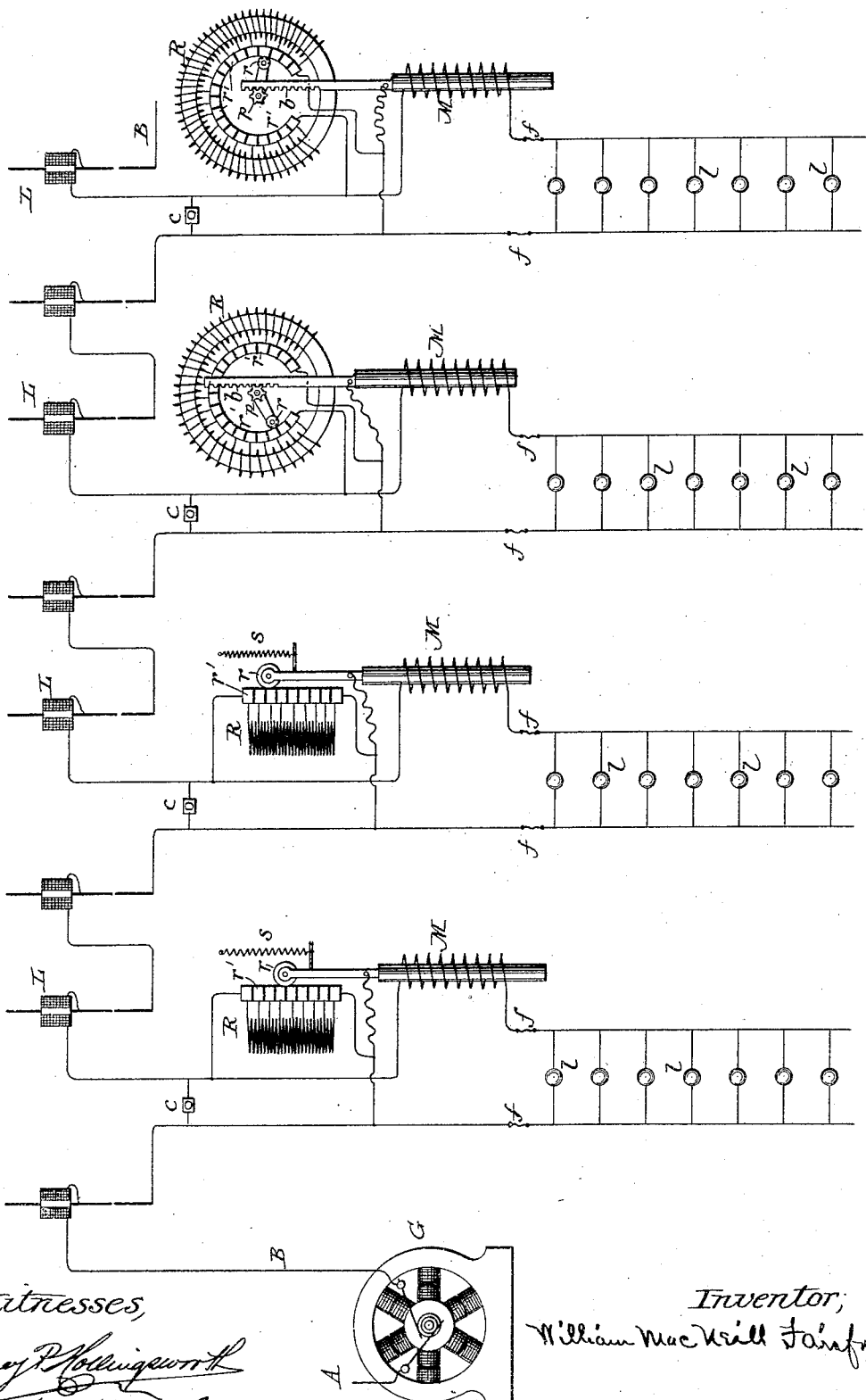
Witnesses
Inventor,
William MacNeill Fairfax

UNITED STATES PATENT OFFICE.

WILLIAM MacNEILL FAIRFAX, OF BROOKLYN, NEW YORK.

SYSTEM OF ELECTRICAL DISTRIBUTION.

SPECIFICATION forming part of Letters Patent No. 549,189, dated November 5, 1895.

Application filed February 7, 1893. Serial No. 461,370. (No model.)

*To all whom it may concern:*

Be it known that I, WILLIAM MACNEILL FAIRFAX, a citizen of the United States, residing in Brooklyn, in the county of Kings and State of New York, have invented certain new and useful Improvements in Systems of Electrical Distribution, of which the following is a specification.

My invention relates to systems of distributing electricity, and particularly to means whereby devices arranged in series, such as arc lamps, and devices arranged in multiple arc, such as incandescent lamps, may be arranged in the same circuit or connected thereto and be supplied from the same source or sources of energy.

It is well known that when currents of electricity are to be carried to a long distance it is of prime importance to have the minimum amount of copper possible used, and if by any means in distributing electric energy over wide areas I can supply arc lamps and other devices arranged in series and incandescent lamps or other devices arranged in multiple arc from a single cuircuit, which may receive currents of high tension, and therefore which can be composed of wire of small cross-section I shall have obtained an immense saving of the principal factor of expense in a system of electrical distribution. The difficulty heretofore has been that series devices require currents of approximately-constant quantity, while devices arranged in multiple arc require currents of constant potential, and therefore it has been usually necessary to supply said devices from separate circuits and separate sources of energy. By my arrangement and apparatus I, from one source of energy and by means of one circuit, am enabled to supply these two sets of devices.

Referring to the accompanying drawing, G indicates a generator of alternating currents. A B are the line-wires extending therefrom from the opposite poles of the generator. L L are a number of arc lamps or other similar devices arranged in series in the said line-circuit A B.

$l\ l$ are incandescent lamps or other similar devices arranged in multiple arc with each other, each group of said multiple-arc devices being connected in series with the lamps L L.

R is a variable-inductive resistance composed of a number of coils of wire arranged, preferably, on cores of iron suitably laminated and arranged in shunt to the devices $l\ l$.

M is a magnet which is connected, preferably, in series in the circuit in which $l\ l$ are arranged.

S is a spring attached to the core of M, and $r$ is a roller-contact which passes over a series of contact-plates $r'$. These plates $r'$ are connected to the various coils in succession in such a way that when the roller $r$ rests upon one of the extreme contact-plates—for example, the upper one, as shown in the figure—all the coils of the inductive resistance are short-circuited or cut out, while when the roller-contact is on the contact at the other end of the series $r'$ all the coils of the inductive resistance are in circuit.

The magnet tends to bring all the coils of the inductive resistance into action, while the spring S tends to cut all the coils out of action. The magnet M may be wound in addition with shunt-coils—that is, coils in parallel with the lamps $l\ l$—and these shunt-coils may be either cumulative with the series coils on the magnet or differential therewith.

It will be noticed that the inductive resistances shown on the left-hand side of the figure are of simpler or cruder construction than those shown on the right-hand side of the figure. In those shown on the right-hand side of the figure there may be seen a rack-bar and pinion arrangement which permits a very slight movement of the rack-bar, which is controlled by the magnet M to cause a very considerable movement of the contact-roller $r$, fixed to the pinon $p$. The rack-bar is designated by the letter $b$. Any other arrangement of apparatus may be used which would enable a small movement of the armature of the magnet to cause a wide movement of the contact-roller $r$.

The action of my apparatus is as follows: When all the incandescent lamps are in circuit, it is obvious that the greatest amount of current should be diverted through them, while, on the other hand, as the lamps $l\ l$ are switched out of action, less current is needed for the group in which they are placed, and hence more current should be diverted away from and in shunt to these lamps $l\ l$. This is accomplished by means of the inductive resistance R and the magnet M, for it is evident that when the lamps *l l* are all in action the greatest amount of current flows through the wire in which the magnet M is connected in series, and therefore the contact-roller is moved in such a direction as to cut in all the coils of the inductive resistance R, and as lamps are cut out of the group less current flows through the magnet-coils, and therefore the spring tends to pull, or, in fact, does pull the roller-contact in the opposite direction, and in this way cuts out coils of the inductive resistance R and thereby diminishes the opposition of the said resistance to the flow of current around and in shunt to the lamps *l l*. A differential coil *d* may take the place of the spring S or may aid said spring in its action.

It is to be carefully noticed that a very important part of this invention lies in the fact that an inductive resistance like R is not a consumer of energy, for it simply acts as a counter-electromotive-force device, while a dead resistance, such as used on continuous-current circuits, would consume energy in such amounts as to be a very serious item in preventing continuous-current apparatus being used. It is this feature of the counter-electromotive-force device or the inductive resistance R which renders it particularly fitted for the above-described use, for it is evident that in the present state of the art a magnet, a contact-maker, and contact-plates arranged as above described are fully capable of performing their function accurately, efficiently, and cheaply. In order, however, to insure perfect safety of operation and a practical continuity of the electric circuit under all possible working conditions, I have provided, as shown in the drawing, safety shunt-circuits *c c*, which are arranged in shunt to the inductive resistances and to each of the groups of incandescent lamps, so that when through any cause the lamp-circuit is broken or the inductive resistance fails to act promptly or gets out of order a safe by-path may be had around these temporarily-incapacitated devices. This shunt safety-circuit has in it a device such as is used with series incandescent lights, which may consist, for example, of a chemical or an electromagnetic or even a manual cut-out. The chemical cut-out may consist of some compounds—for example, of mercury—which under the sudden action of the influx of current, due to the temporary incapacity of the other circuits, may be converted into metallic mercury and thereby form a path of low resistance for the current in the main line. I also provide safety-fuses *f f*, which are inserted on each side of the group of incandescent lamps between the leading-in wires and the lamps. These safety-fuses may consist of any conductor—for example, lead—which under great increase of current or other abnormal condition of the circuit fuses or otherwise breaks the wires leading to the group of incandescent lamps. It is evident that with these safety devices and the careful use of the high insulating material known to the present state of the art incandescent lamps in houses and other similar places may be connected in the above manner to street-circuits carrying either moderate or high-tension currents with perfect impunity.

I claim—

1. The method of electrical distribution which consists in supplying current to a number of groups of devices in succession, and maintaining the potential constant in each of said groups by generating a counter electromotive-force in derivation to each group, and varying said counter electro-motive force by the varying current in the respective group.

2. The method of electrical generation and distribution which consists in generating currents of approximately constant quantity, supplying said currents to a number of groups of translating devices in succession, and maintaining the potential constant in each of the groups by variably shunting currents around each group in approximately direct ratio to the decrease of load in said group by generating a counter electro-motive force in derivation to the devices in said group, and varying said counter electro-motive force in direct ratio to the load in said group through the action of the current in said group.

3. The method of electrical generation and distribution which consists in generating currents of approximately constant quantity, supplying said currents to a number of groups of translating devices in succession, and maintaining the potential constant in each of the groups by variably shunting currents around each group in approximately direct ratio to the decrease of load in said group by generating a counter electro-motive force in derivation to the devices in said group, and varying said counter electro-motive force in approximately direct ratio to the load in said group by the varying current in said group.

4. The method of electrical distribution which consists in generating alternating currents of approximately constant quantity supplying said currents to a number of groups of translating devices in succession, and maintaining the potential constant in each of said groups by generating a counter electro-motive force in derivation to each group, and varying said counter electro-motive force by the varying current in the respective group.

5. The combination of a generator of currents of constant quantity, a line circuit extending therefrom, a number of groups of translating devices connected in said line circuit in series, each group having devices arranged therein in multiple arc, a counter electro-motive-force device arranged in shunt to each of said groups, and means controlled by the current in said group which vary the counter-electro-motive force of said device in direct ratio to the load on said group.

6. The combination of a generator of alternating currents of constant quantity, a line circuit extending therefrom, a number of groups of translating devices connected in said line circuit in series, each group having devices arranged therein in multiple arc, a counter electro-motive-force device arranged in shunt to each of said groups, and means controlled by the current in said group which vary the counter-electro-motive force of said device in direct ratio to the load on said group.

7. The combination of a generator of alternating currents of constant quantity, a line circuit extending therefrom, a number of groups of translating devices connected in said line circuit in series, each group having devices arranged therein in multiple arc, a counter electro-motive-force device arranged in shunt to each of said groups, and electromagnetic means controlled by the current in said group, which means vary the counter electro-motive force of the said device in direct ratio to the load on the said group.

8. The combination of a generator of alternating currents of constant quantity, a line circuit extending therefrom, a number of groups of translating devices connected in said line circuit in series, each group having devices arranged therein in multiple arc, a counter electro-motive-force device arranged in shunt to each of said groups, and an electro-magnet arranged in circuit with each group of translating devices controlled by the current in the respective group to vary the counter electro-motive force of the said device in direct ratio to the load on said group.

9. The combination of a generator of alternating currents of constant quantity, a line circuit extending therefrom, a number of groups of translating devices connected in said line circuit in series, each group having devices arranged therein in multiple arc, a counter electro-motive-force device arranged in shunt to each of said groups, and an electro-magnet arranged in series with each group of translating devices controlled by the current in the respective group to vary the counter-electro-motive-force of said device in approximately direct ratio to the load on said group.

10. The combination of a generator of currents of constant quantity, a line circuit extending therefrom, a number of groups of translating devices connected in said line circuit in series, each group having devices arranged therein in multiple arc, a counter electro-motive-force device arranged in shunt to each of said groups, means controlled by the current in the respective group which vary the counter electro-motive force of said device in direct ratio to the load on said group, and safety shunt circuits whereby a safe by-path may be had for the main current around any of the temporarily incapacitated devices in any of the groups.

WILLIAM MacNEILL FAIRFAX.

Witnesses:
C. M. BROOKE,
BESSIE WASHINGTON MILLER.